US006966208B1

(12) United States Patent
Collins (10) Patent No.: US 6,966,208 B1
(45) Date of Patent: Nov. 22, 2005

(54) METHOD OF PRODUCING SUPPORT PILLARS

(75) Inventor: Richard E. Collins, Sydney (AU)

(73) Assignee: The University of Sydney, Sydney (AU)

( * ) Notice: Subject to any disclaimer, the term of this patent is extended or adjusted under 35 U.S.C. 154(b) by 129 days.

(21) Appl. No.: 10/110,696

(22) PCT Filed: Oct. 18, 2000

(86) PCT No.: PCT/AU00/01265

§ 371 (c)(1),
(2), (4) Date: Jul. 25, 2002

(87) PCT Pub. No.: WO01/28707

PCT Pub. Date: Apr. 26, 2001

(30) Foreign Application Priority Data

Oct. 18, 1999 (AU) ...................................... PQ3494

(51) Int. Cl.[7] .............................................. B21D 31/00
(52) U.S. Cl. ............................................ 72/47; 72/204
(58) Field of Search ........................ 72/204, 325, 384, 72/47; 29/413; 225/94, 96; 52/786.13

(56) References Cited

U.S. PATENT DOCUMENTS

| 4,268,948 A | * | 5/1981 | Strandell et al. ........... 29/527.6 |
| 4,292,718 A | * | 10/1981 | Iijima .................... 29/898.053 |
| 4,296,542 A | * | 10/1981 | Gotman ....................... 438/17 |
| 4,504,181 A | | 3/1985 | Khoury |
| 4,562,628 A | * | 1/1986 | Marneffe et al. .......... 29/25.42 |
| 5,891,536 A | * | 4/1999 | Collins et al. ................ 428/34 |
| 5,902,652 A | * | 5/1999 | Collins et al. ................ 428/34 |

FOREIGN PATENT DOCUMENTS

| DE | 197 02 444 A1 | 7/1998 |
| GB | 2 026 625 A | 2/1980 |
| WO | 95/01493 A1 | 1/1995 |
| WO | 96/12862 A1 | 5/1996 |

* cited by examiner

Primary Examiner—Lowell A. Larson
(74) Attorney, Agent, or Firm—Venable LLP; Michael A. Sartori (57) ABSTRACT

A method of producing support pillars for use in the fabrication of evacuated glass panels and, in particular, for use in the fabrication of evacuated glazing. The method comprises the steps of: (a) forming in opposite surfaces (15, 16) of a metal blank (10) periodically spaced pairs of aligned linearly extending indentations (13, 14 and 17, 18) and, as a consequence, creating regions of weakness (23) that extend between troughs (24) of the respective pairs of indentations, and (b) parting individual support pillars (28) from the metal blank (in which the indentations are formed) at the respective regions (23) of weakness.

21 Claims, 8 Drawing Sheets

METHOD OF PRODUCING SUPPORT PILLARS

FIELD OF THE INVENTION

This invention relates to a method of producing support pillars for use in maintaining two glass sheets of an evacuated glass panel in spaced-apart relationship. The invention has application and is hereinafter described in the context of vacuum glazing.

BACKGROUND OF THE INVENTION

Vacuum glazing typically comprises two confronting plane sheets of glass which are joined together and are hermetically sealed around their marginal edges. The glass sheets are separated by an evacuated space, and the separation is maintained against atmospheric pressure by an array of support pillars. The pillars typically are 0.1 to 0.2 mm high and have lateral dimensions in the order of 0.2 to 0.5 mm. Also, the pillars are distributed in the array with the spacing between neighbouring pillars being in the order of 20 to 30 mm.

The shape and dimensions of the support pillars are critical. For example, the two bearing surfaces of each pillar should be smooth and accurately parallel, whilst all pillars must have substantially the same height to within close tolerances, typically in the order of ±2 $\mu$m.

During manufacture of the vacuum glazing the pillars are placed on the upper surface of one of the glass sheets and, during this placement operation, it is essential that each pillar should stand on one of its bearing surfaces. If the pillars are incorrectly orientated they will have an inappropriate height. For example, in the case of pillars in the form of rectangular prisms, incorrectly orientated pillars will have heights that are greater than that of the surrounding pillars, and this will cause excessive stress in and localised damage to the glass sheets when the space between the sheets is evacuated.

Several methods have been described for manufacturing the support pillars.

The pillars may be made from solder glass, a low melting point glass with a coefficient of expansion close to that of the glass sheets. The solder glass is deposited as a powder, slurry or as pre-forms on one of the glass sheets. The solder glass melts during the high temperature operation that is employed to form the edge seal and fuses to the glass sheets. Thereafter, the solder glass solidifies, on cooling, to form the support pillars.

Composite pillars have also been described. Each of these pillars consists of a non-melting core which is surrounded by solder glass.

Metal pillars have also been used in vacuum glazing. Metal pillars typically are formed from sheet material using double sided photolithography and chemical or electrolytic etching. Such a process results in the formation of a pillar having an edge shape that causes it automatically to stand on one of its bearing surfaces when placed on the supporting glass sheet.

Cylindrical metal pillars have also been produced by punching. With this manufacturing method, however, it is difficult to achieve a smooth face on the surface of the pillar that is impacted during the punching operation due to dimensional characteristics of the punching tool. Some post-punching treatment is therefore normally required for such pillars to remove a burr from the impacted face. A further disadvantage of punched pillars is that they may rest on one of their sides, during positioning on the glazing, and may not stand on their bearing surfaces.

In some evacuated glazing designs it has been found that small cracks occur in the glass sheets close to the points where the pillars contact the sheets. These appear because of shear forces that are established between the pillars and the glass sheets, due to relative movement of the glass sheets. The cracks can be avoided if the ends of the pillars are coated with soft material which can deform under relative movement of the glass sheets.

It has proved difficult to employ the etching process to manufacture composite pillars that are formed with a high mechanical strength metal core and soft end caps. This is because an etchant has not been found which is compatible with the dissimilar materials of the core and the end caps.

Also, punching is not suitable for producing such a pillar because the soft metal on the impacted face of the pillar results in an even larger burr than occurs on punched pillars without soft end caps.

Ceramic materials have also been employed for use in fabricating pillars for use in vacuum glazing. Individual pillars are cut from a ceramic sheet using a diamond saw and this method would, in principle, be suitable for making composite pillars with a high strength ceramic core and soft end caps. However, a disadvantage of this method is that the pillars are cut in the form of rectangular prisms and individual pillars may therefore rest on their sides during the placement process. Furthermore, the pillars made by this method are costly because of the slow speed of the diamond sawing operation.

The present invention seeks to provide a method of producing support pillars which avoids or diminishes the above mentioned problems of the prior art methods.

SUMMARY OF THE INVENTION

Broadly defined, the present invention provides a method of producing support pillars for use in the fabrication of evacuated glass panels and which comprises the steps of:
(a) forming in opposite surfaces of a metal blank pairs of aligned linearly extending indentations and, as a consequence, creating regions of weakness that extend between troughs of the respective pairs of indentations, and
(b) parting individual ones of the support pillars from the metal blank at the respective regions of weakness without deforming the opposite surfaces that are bound by the indentations in the metal blank.

PREFERRED FEATURES OF THE INVENTION

The indentations may be formed with a tool that has two inclined cutting surfaces, so that a linearly extending V-shaped indentation will be created. The cutting surfaces of the tool may be inclined symmetrically or asymmetrically. However, the indenting tool preferably is provided with one vertical cutting surface and one inclined cutting surface, so that two tools may be aligned with respect to their vertical surfaces.

It has been found that, even when the indenting tool is formed with one vertical cutting surface and one inclined cutting surface and, as a consequence, asymmetrical indentations are formed in the surfaces of the metal blank, when the support pillars are parted from the metal blank they exhibit peripheral chamfers that prevent the support pillars from resting on their sides when placed on a supporting glass sheet.

The indentations may be formed to a depth which is just sufficient to enable the individual support pillars to be broken away from the metal blank. Alternatively, at the other extreme, the indentations may be formed to a depth which results automatically in parting of the individual support pillars from the blank, due to a minuscule amount of material being left in the region of weakness between the respective pairs of indentations. In both cases, however, the indentations are not formed to such a depth as would cause convergence of the (opposing) indentations of each pair. To effect convergence of the opposing indentations of each pair would require that opposing indenting tools should actually meet, with a possibility of them crashing and sustaining damage, and this clearly would not be a desirable outcome.

The metal blank may have any one of a number of configurations. For example, it may be in the form of a metal strip, a plate or a wire. When the metal blank has a width larger than the desired width of the support pillars, the metal blank will be scored with orthogonal pairs of aligned linearly extending indentations.

When the metal blank is in the form of a cylindrical wire, the method of the present invention will further comprise the step of rolling the metal blank into a strip having the desired thickness of the support pillars. The rolling step may be performed simultaneously with the formation of the indentations or be performed as a separate step prior to the formation of the indentations.

The support pillars may comprise composite structures, in which case the method of the present invention will further comprise the step of forming a coating on at least one surface of the metal blank prior to formation of the indentations. Thereafter, the indentations preferably will be formed in a manner to ensure that they extend through the coating and into the substrate of the metal blank.

The coating will preferably be formed from a relatively soft material, whilst the substrate will be formed from a material that has a high compressive strength.

The method of the present invention most preferably comprises the steps of forming coatings on both of the opposite surfaces of the substrate.

The invention will be more fully understood from the following description of preferred methods of forming the support pillars. The description is provided with reference to the accompanying drawings.

BRIEF DESCRIPTION OF THE DRAWINGS

In the drawings

FIGS. 1(a) to (f) illustrate a first method of producing support pillars embodying the invention;

FIGS. 3(a) and (b) illustrate the method of producing support pillars as shown in FIGS. 1(a) to (f) but when applied to a metal sheet which is clad on opposite faces with a coating material;

FIGS. 4(a) to (d) illustrate a second method of producing support pillars embodying the invention;

FIGS. 7(a) and (b) illustrate a method of producing support pillars in an alternative way to that which is illustrated in FIGS. 1(a) to (f); and FIGS. 8(a) and (b) illustrate a method of producing support pillars in a further alternative way to that which is illustrated in FIGS. 1(a) to (f).

DETAILED DESCRIPTION OF THE INVENTION

Figure 1:
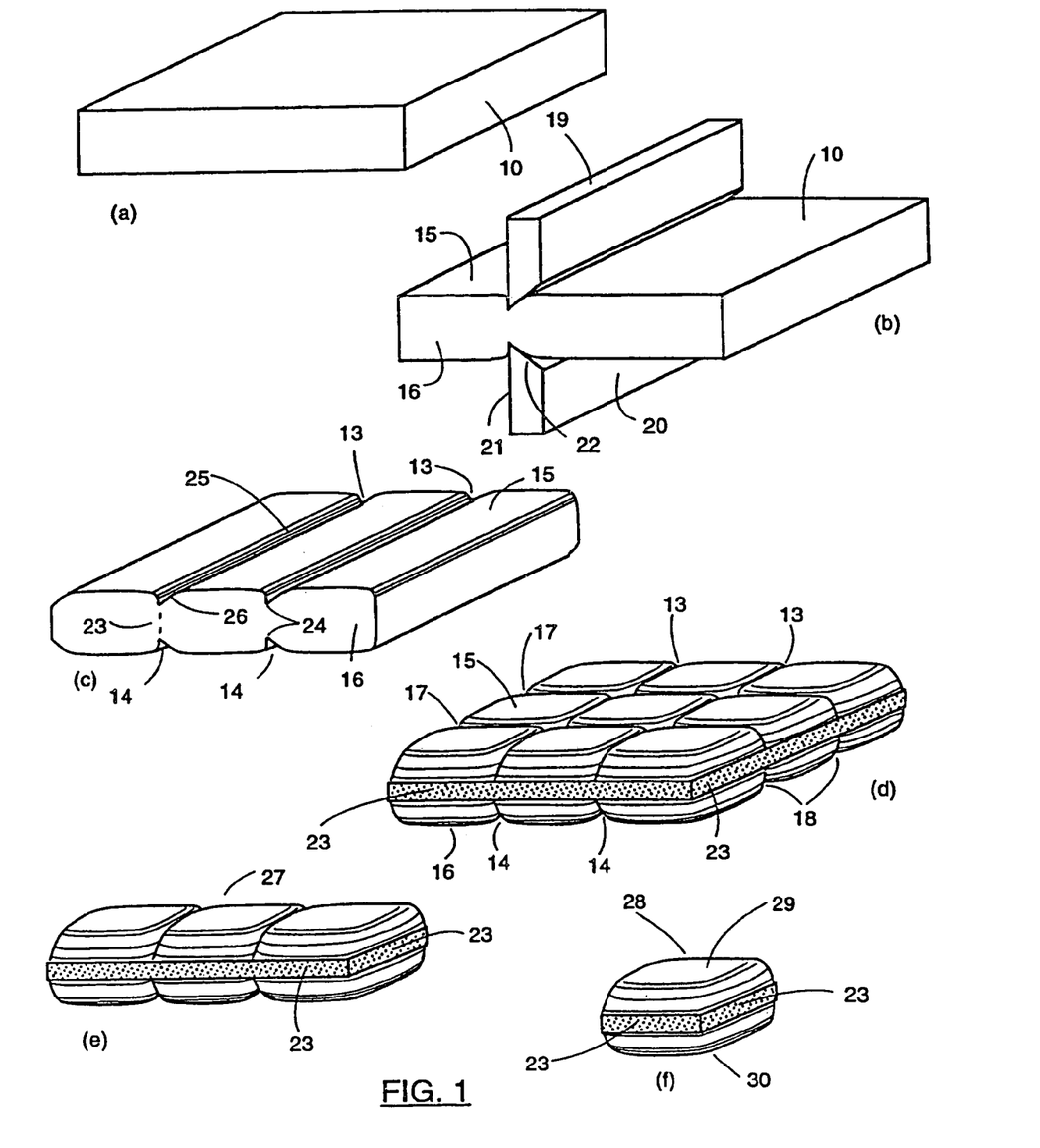

As shown in FIG. 1, a metal blank 10 in the form of a metal sheet is employed as a starting material. The sheet has a thickness that is equal to the required thickness of the support pillars that are to be produced from the sheet.

Pairs of aligned linearly extending indentations 13 and 14 are formed in opposite surfaces 15 and 16 of the metal blank 10. The indentations 13 and 14 of each pair extend parallel with one another and linearly across the width of the metal blank 10.

After forming plural pairs of the indentations 13 and 14 across the width of the metal blank 10, further pairs of orthogonally extending indentations 17 and 18 are formed in a similar manner to extend linearly in the direction of the length of the metal blank 10.

Indenting tools (or blades) 19 and 20 are employed to form the indentations 13, 14 and 17, 18. Each of the tools has a vertical cutting surface 21 and an inclined cutting surface 22, and the tools are forced into the opposite surfaces of the metal blank, as shown in FIG. 1(b), to create the linearly extending indentations as shown in FIG. 1(c).

As a consequence of forming the indentations, regions 23 of weakness are created that extend between the troughs 24 of the respective pairs of indentations 13 and 14 or 17 and 18. Also, in forcing the indentations into the opposing surfaces of the metal blank, a curved wall 25 is created at one side of each indentation and a chamfered wall 26 is created at the other side of each indentation. Thus, an asymmetrical V-shaped indentation is created.

When forming the second series of indentations 17 and 18, the metal blank 10 may be rotated through 90° and be reinserted between the same indenting tools 19 and 20 as are used in forming the first series of indentations 13 and 14. The resultant (intermediate) product is as shown in FIG. 1(d), having a number of rectangular portions separated by the orthogonally extending indentations.

Thereafter, one strip 27 of the rectangular portions is broken away from the metal blank 10 by parting it along the region of weakness 23 that extends between the troughs 24 of the respective pairs of indentations. As a final step, individual support pillars 28 are broken away from the strip 27, as shown in FIG. 1(f), again by parting the support pillar along the region of weakness 23.

Figure 2:
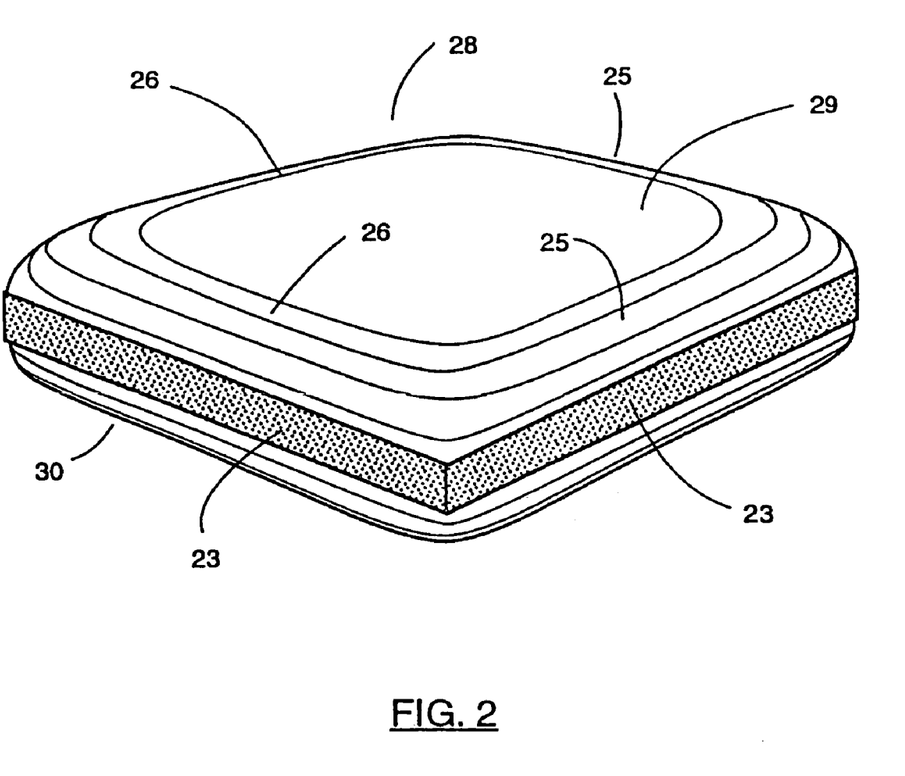
FIG. 2 shows an enlarged perspective view of one support pillar that is produced by the method illustrated by FIGS. 1(a) to (f)

As shown in FIG. 1(f) and, more clearly, in FIG. 2, each resultant support pillar has marginal edges 23 (corresponding to the respective zones of weakness) which have cross-sectional areas that are very small relative to the cross-sectional areas of the top and bottom (bearing) surfaces 29 and 30 of the pillar. This, coupled with the curved and chamfered wall portions 25 and 26, ensures that the pillars will rest on one or the other of the bearing surfaces 29 or 30.

Figure 3:
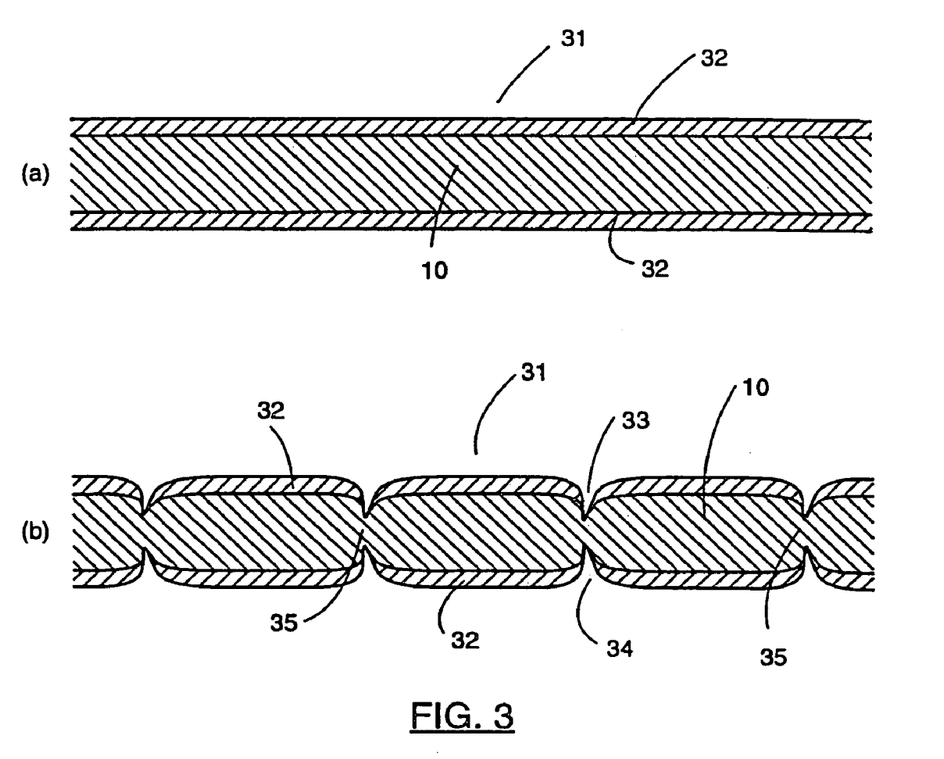
Figure 4:
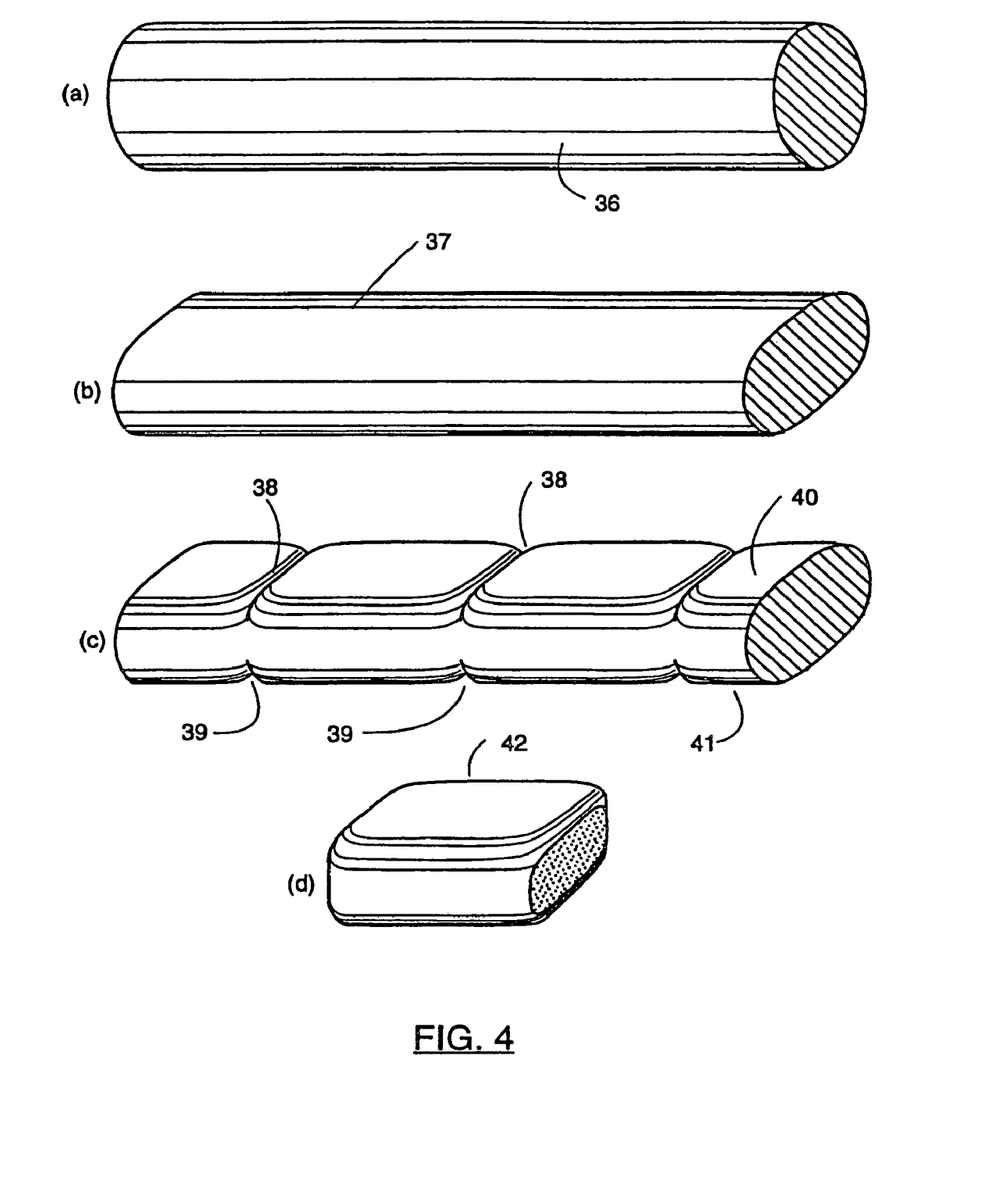

In the second embodiment of the invention, as illustrated in FIGS. 3(a) and (b), a metal blank 31 comprises a metal sheet 10 that is clad on its opposite surfaces with a cladding material 32 that is soft in relation to the material from which the metal sheet 10 is formed. The metal sheet 10 is composed of a material having a compressive strength sufficient to withstand the compressive force exerted by spaced-apart glass sheets under the previously described conditions.

The clad metal blank 31 of FIGS. 3(a) and (b) is formed with indentations 33 and 34 in the same manner as described with reference to FIGS. 1(a) to (f), but care must be taken to ensure that the indentations 33 and 34 extend through the cladding material 32 and enter the substrate material 10. This is required in order to create a region of weakness 35, within the substrate metal 10, between the troughs of the respective pairs of indentations 33 and 34.

As an alternative to the use of the metal sheet 10 as a starting material, the support pillars may be formed from wire as shown in FIGS. 4(a) to (d) of the drawings. In this case, wire 36 which has a high compressive strength in a radial direction is rolled to form a strip-form metal blank 37 having a minor axis thickness that is equal to the required thickness of the pillars. A single series of parallel indentations is formed in the metal blank 37, with respective pairs of linearly extending indentations 38 and 39 being formed in opposite surfaces 40 and 41 of the metal blank. The indentations 38 and 39 may be formed in the same manner as the indentation 13 and 14 in the arrangement shown in FIG. 1(c). Thereafter, individual pillars 42 may be parted from the metal blank in the manner as above described.

Figure 5:
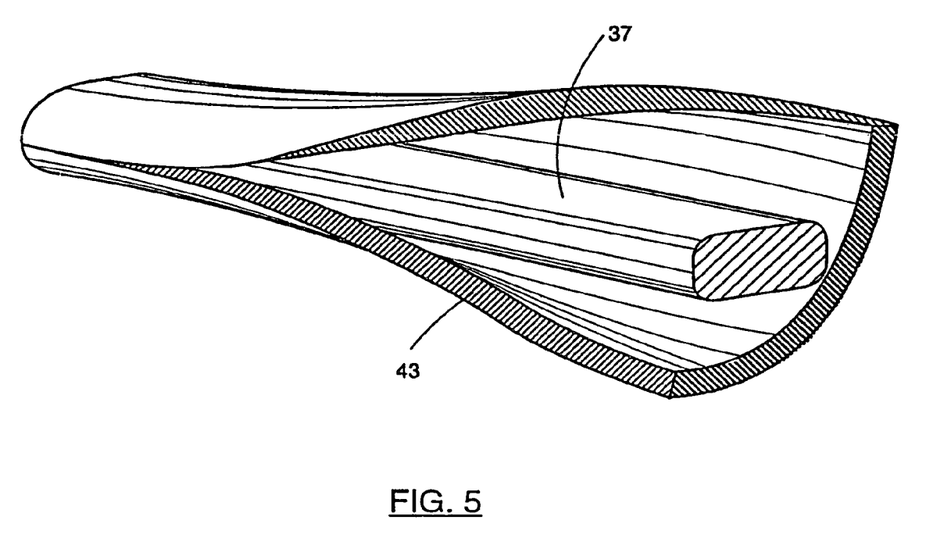
FIG. 5 shows one method of cladding a substrate to form a metal blank that is to be used in forming pillars by the method as illustrated in FIGS. 4(a) to (d)
Figure 6:
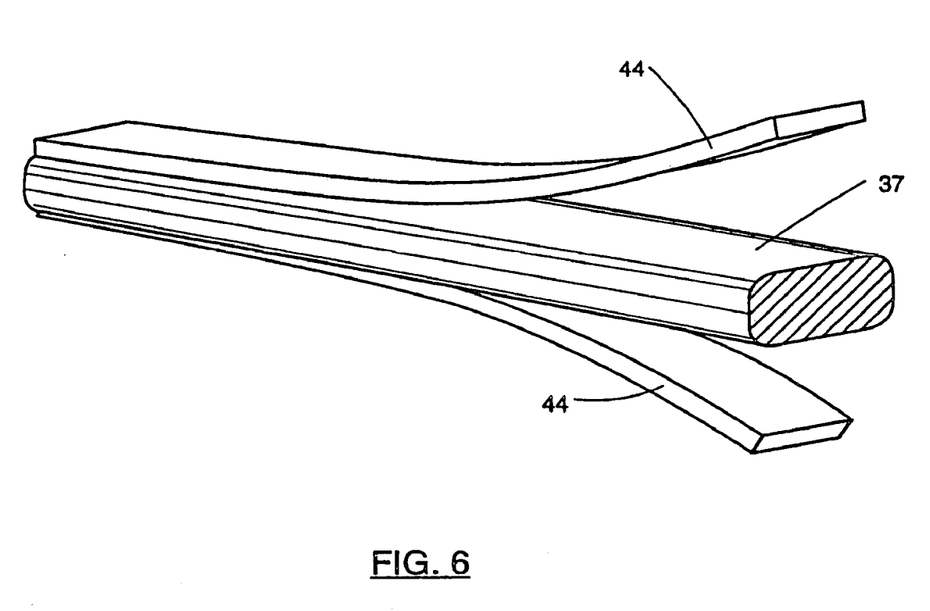
FIG. 6 shows a second method of cladding a substrate to form the metal blank to be used in forming pillars by the method as illustrated in FIGS. 4(a) to (d)

FIGS. 5 and 6 show alternative methods of cladding the strip-form metal blank 37 of FIGS. 4(a) to (d) with a relatively soft cladding material, so as to produce a composite metal blank that is akin to that shown in FIG. 3(a). In FIG. 5 the cladding material 43 is applied as a sleeve that surrounds the substrate of the metal blank, whereas in FIG. 6 the cladding material is bonded as laminates to opposed surfaces of the substrate that forms the metal blank.

Figure 7:
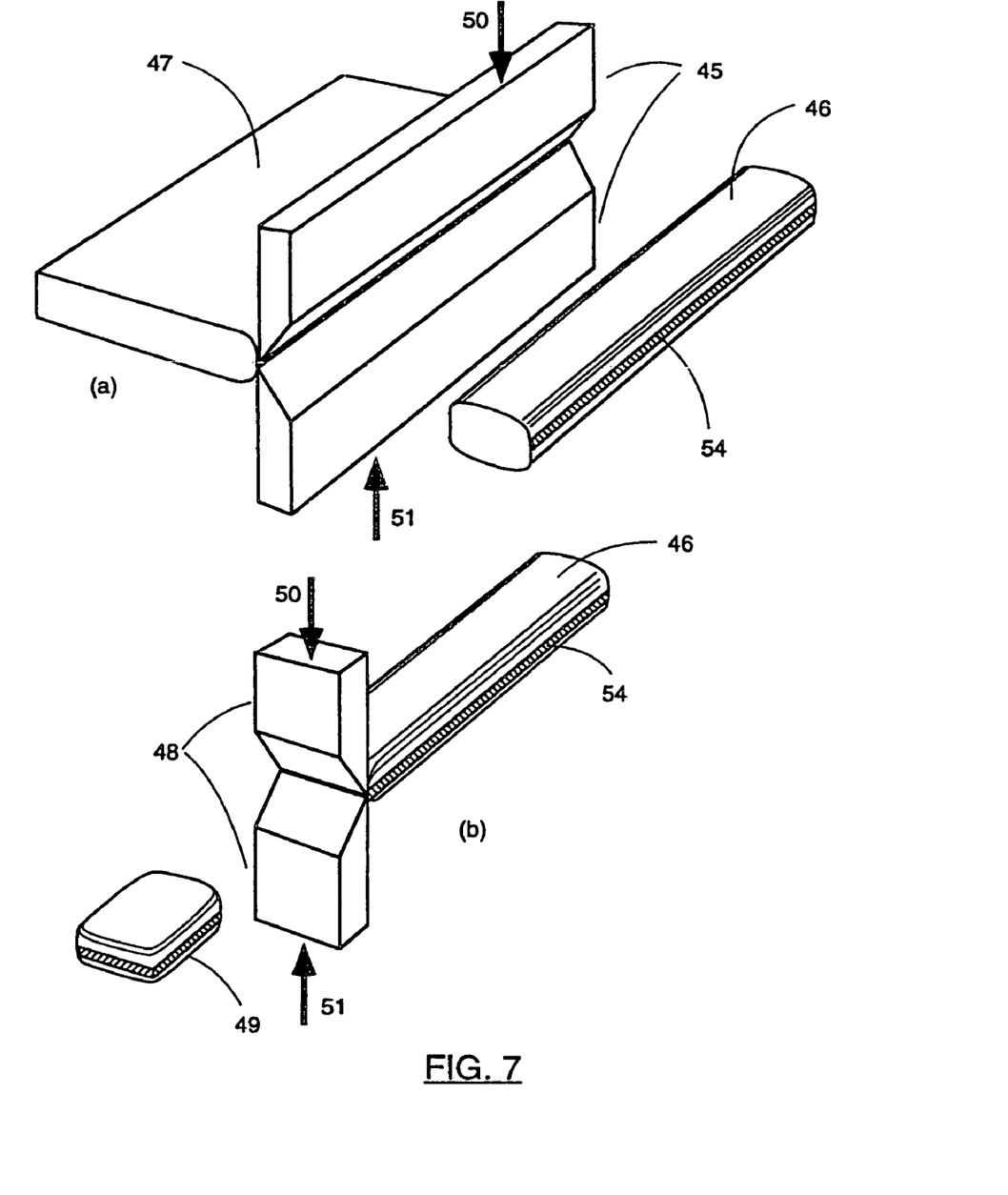
Figure 8:
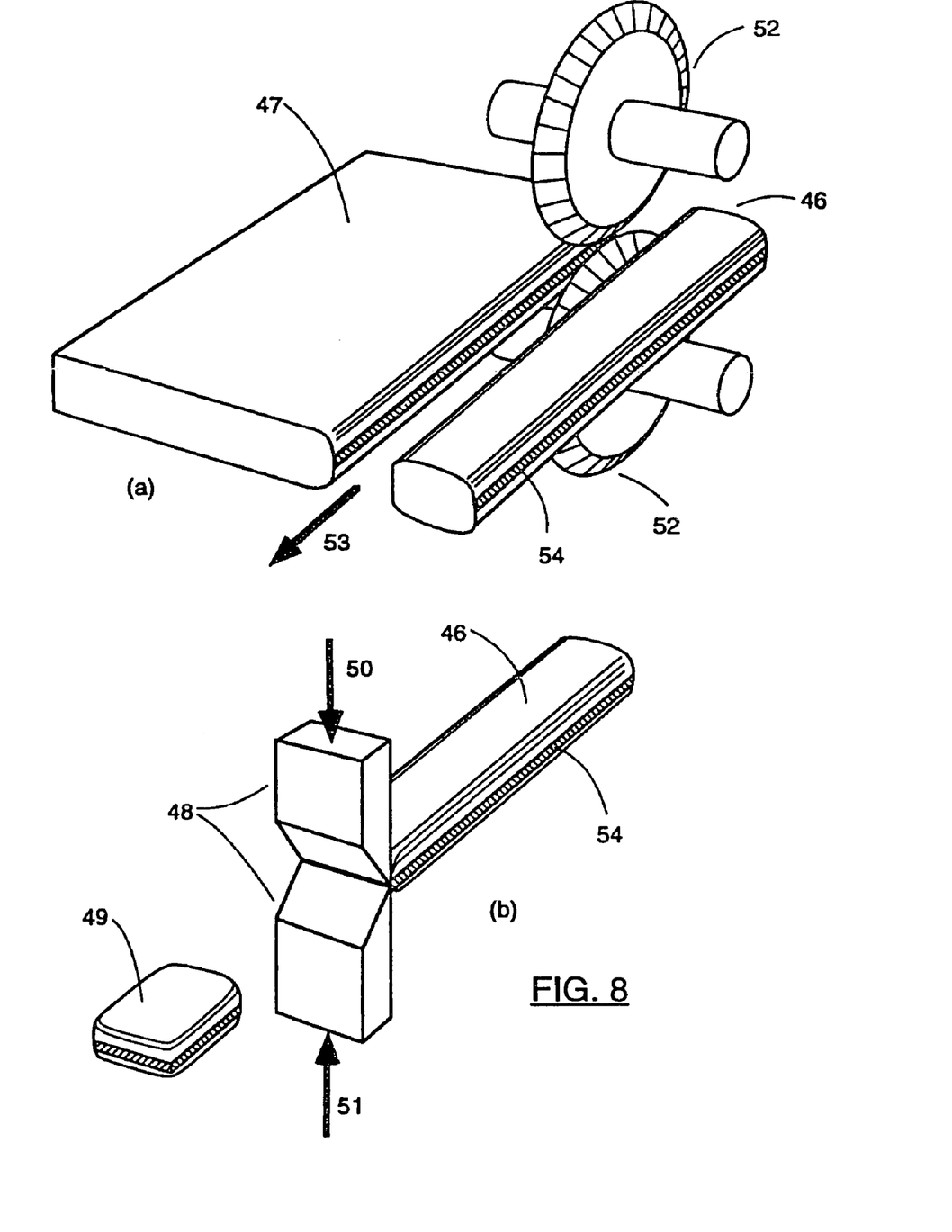

FIGS. 7(a) and (b) and FIGS. 8(a) and (b) illustrate further methods of forming the support pillars.

The method that is illustrated in FIGS. 7(a) and (b) is only slightly different from that which has been described above with reference to FIGS. 1(a) to (f). A first pair of indenting blades 45 is employed to create linear indentations that define successive strips 46 that are parted from a metal blank 47, and a second pair of indenting blades 48 is employed to create the indentations that permit parting of individual pillars 49 from the strip 46. The blades are actuated in the directions indicated by arrows 50 and 51 and the blades are moved sufficiently close to one another as to leave only a minuscule amount of metal in the region of weakness 54 between the opposing indentations of each pair of indentations.

The alternative method as illustrated in FIGS. 8(a) and (b) is somewhat similar to that shown in FIGS. 7(a) and (b), except that a first pair of indenting blades 52 is provided in the form of indenting discs, between which the metal blank 47 is passed in the direction indicated by arrow 53.

Further variations and modifications may be made in the above described methods of performing the invention without departing from the scope of the invention as defined in the appended claims.

What is claimed is:

1. A method of producing evacuated glass panel support pillars from a blank containing metal and having a cladding, whereby the resultant pillar has the cladding disposed on at least one of two opposing glass contacting surfaces, the method comprising:
   (a) forming, in opposite surfaces of the blank, pairs of aligned linearly extending indentations such that a respective one of the indentions is caused, in a single operation, to extend completely through the cladding, whereby, as a consequence, regions of weakness are created in the blank that extend between troughs of the respective pairs of indentations, and
   (b) parting individual ones of the support pillars from the blank at the respective regions of weakness without deforming the opposing glass panel contacting surfaces of the support pillars.

2. A method as claimed in claim 1 wherein the indentations of each pair are formed to a depth sufficient to enable individual ones of the support pillars to be broken away from the blank at the regions of weakness between the troughs of the respective pairs of indentations.

3. A method as claimed in claim 1 wherein the indentations of each pair are formed to a depth such that the troughs of the respective pairs of indentations almost converge and, as a consequence, individual ones of the support pillars automatically part from the blank.

4. A method as claimed in claim 1 wherein each indentation has a profile that is substantially V-shaped as viewed in the linear direction of the indentation.

5. A method as claimed in claim 4 wherein each indentation has an asymmetrical V-shape.

6. A method as claimed in claim 1 wherein each indentation is formed by an indenting tool that has a vertical first cutting surface, a second cutting surface that is inclined with respect to the first cutting surface and an acute included angle between the first and second cutting surfaces.

7. A method as claimed in claim 1 wherein the metal blank is provided in the form of a substantially flat sheet.

8. A method as claimed in claim 7 wherein periodically spaced pairs of the indentations are formed to extend in a first direction and further periodically spaced pairs of indentations are formed to extend in a second direction orthogonal to the first direction.

9. A method as claimed in claim 1 wherein the blank is provided in the form of a strip and wherein pairs of aligned linearly extending indentations are periodically spaced along and extend transversely across the strip.

10. A method as claimed in claim 9 further comprising roll-forming a circular-section wire to form the blank.

11. A method as claimed in claim 10 wherein the roll-forming of the wire is performed simultaneously with the formation of the indentations.

12. A method as claimed in claim 10 wherein the roll-forming of the wire is performed prior to formation of the indentations.

13. A method as claimed in claim 1 further comprising coating the blank with a cladding prior to the forming of the indentions.

14. A method as claimed in claim 1 wherein the cladding is provided on each of the opposite surfaces of the blank.

15. A method as claimed in claim 1 wherein the cladding is composed of a material that is soft relative to the blank.

16. A method as claimed in claim 14 wherein the indentations are formed to extend through the cladding on each of the opposite sides and into the blank.

17. A method as claimed in claim 1 wherein at least some of the indentations are formed by an indenting tool in the form of a reciprocating blade.

18. A method as claimed in claim 1 wherein at least some of the indentations are formed by an indenting tool in the form of a rotatable disk.

19. A method of producing support pillars for use in the fabrication of evacuated glass panels and which comprises the steps of:

rolling a strip from a circular-section wire to form a blank containing metal;

forming, in opposite surfaces of the blank, pairs of aligned indentations extending transversely across the width of the blank to create regions of weakness that extend between troughs of the respective pairs of indentations, and parting individual support pillars from the blank at the respective regions of weakness without deforming the opposite surfaces that are bounded by the indentations in the blank.

20. A method as claimed in claim 19, wherein the rolling step is performed simultaneously with the forming step.

21. A method as claimed in claim 19, wherein the rolling step is performed prior to the forming step.

* * * * *